March 28, 1950     N. A. HALLWOOD     2,502,090
SCALE

Filed Dec. 19, 1944            4 Sheets-Sheet 1

INVENTOR.
Nathan A. Hallwood
BY
Herschel C. Omohundro
HIS ATTORNEY

March 28, 1950 N. A. HALLWOOD 2,502,090
SCALE
Filed Dec. 19, 1944 4 Sheets-Sheet 2

INVENTOR.
Nathan A. Hallwood

Herschel C. Omohundro
HIS ATTORNEY

March 28, 1950 N. A. HALLWOOD 2,502,090
SCALE

Filed Dec. 19, 1944 4 Sheets-Sheet 3

INVENTOR.
Nathan A. Hallwood
BY
Herschel C. Omohundro
HIS ATTORNEY

March 28, 1950     N. A. HALLWOOD     2,502,090
SCALE

Filed Dec. 19, 1944

INVENTOR.
Nathan A. Hallwood
BY

Herschel C. Omohundro
ATTORNEY

Patented Mar. 28, 1950

2,502,090

UNITED STATES PATENT OFFICE 2,502,090

SCALES

Nathan A. Hallwood, Columbus, Ohio; Thelma T. Hallwood, administratrix de bonis non of said Nathan A. Hallwood, deceased, assignor to Thelma T. Hallwood, Columbus, Ohio Application December 19, 1944, Serial No. 568,817

17 Claims. (Cl. 265—29)

This invention relates generally to weighing machines and is particularly directed to scales used to determine the number of units in a group of duplicative articles.

In taking actual inventories in many lines of manufacture, the laborious and time consuming duty of counting small or minute articles is often encountered. When this duty is performed by hand or entirely manually and a large inventory is being taken, the services of a large number of persons is necessary unless considerable time is allowed. One of the objects of this invention is to provide a machine which may be used to quickly and accurately determine the number of articles in a mass without the necessity of the worker counting them or performing complicated or involved computations.

An object of the invention also is to provide a scale in which a mass of duplicative articles may be placed in a receiver and caused to move a graduated chart and an indicator is moved over the chart in response to the weight of a known number of the articles, the indicator serving to direct the operator's attention to the graduation representing the number of articles contained in the mass.

Another object is to provide a scale having a chart with a row of graduations representing units of weight and numbered reference or counting lines extending across the chart at various angles from the graduations, the scale also having an auxiliary scale for operating a movable reference member in response to the application of a predetermined number of articles to the receiver of the auxiliary scale.

An object also is to provide a counting scale having a chart with a row of graduations representing units of weight and reference lines extending across the chart and helically therearound, the pitch of the adjacent consecutive helixes uniformly increasing.

A further object of the invention is to provide the scale mentioned in the preceding paragraph with a movable reference member which is caused to traverse the chart a distance proportional to the weight of a predetermined number of articles, the reference member being moved across the chart completely by a weight equal to that represented by one graduation in the row mentioned in the preceding paragraph.

A still further object of the invention is to provide a scale of the type mentioned with a movable reference member consisting of a scale having a beam, resistance means, a receiver for a predetermined number of the articles to be counted, and an elongated, transparent vial secured to the beam and movable therewith, the vial being filled with a suitable liquid to the extent of providing a small bubble which moves lengthwise of the vial distances proportional to the weights of predetermined numbers of articles applied to the receiver.

Other objects and advantages of the invention will be apparent from the following description and the accompanying drawings in which the invention has been illustrated in one form.

Figure 1:
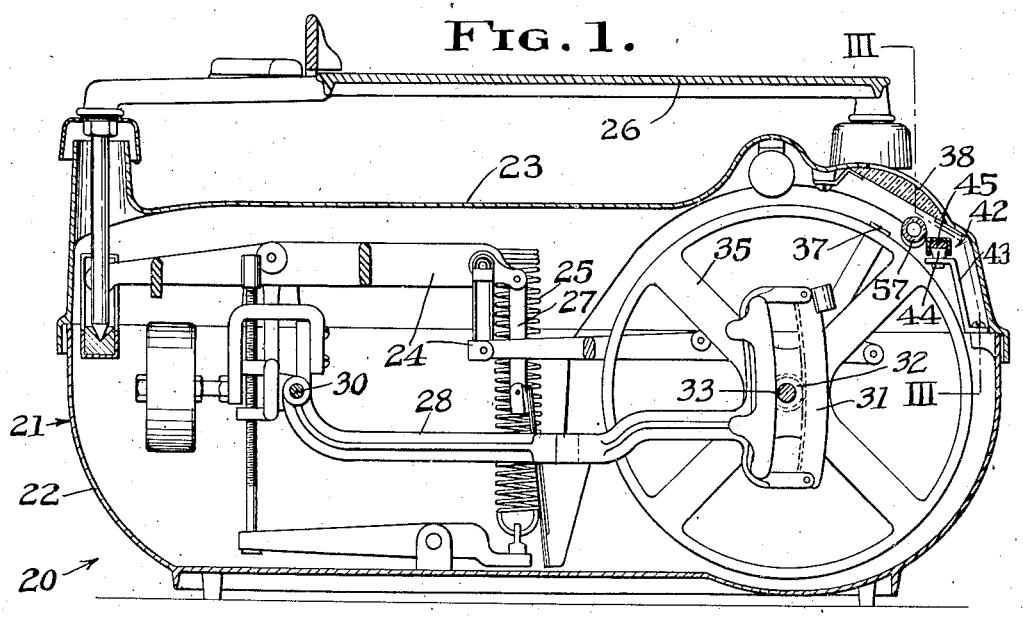
Fig. 1 is a vertical longitudinal sectional view of a scale formed in accordance with the present invention.
Figure 2:
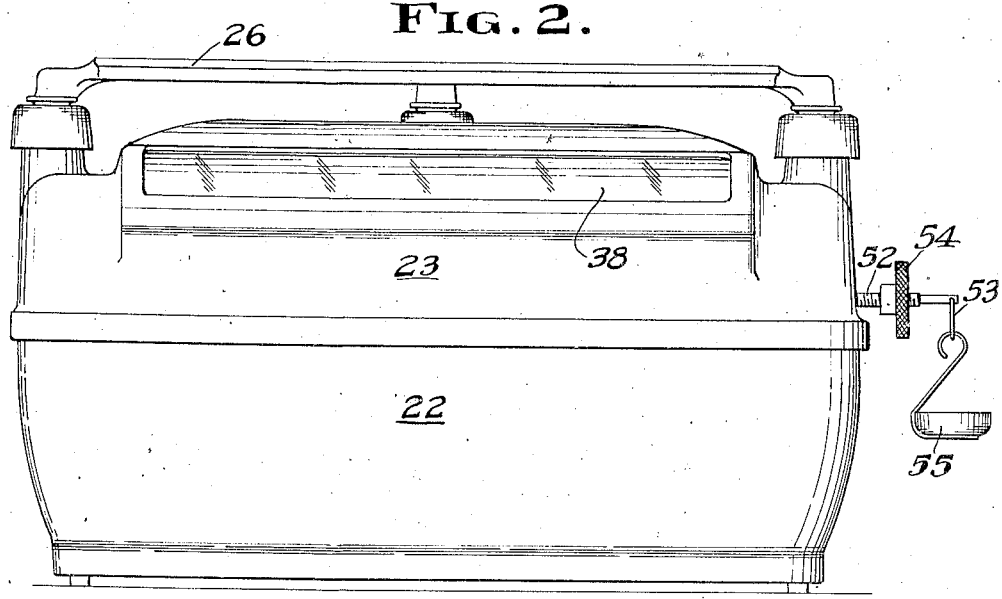
Fig. 2 is a front elevational view of the scale shown in Fig. 1.

Referring more particularly to the drawings, the complete scale is indicated generally by the numeral 20. While the scale shown is of the type having the drum located below the load receiver, it should be obvious to anyone familiar with this art that the invention about to be described would be equally applicable to scales of other types without departing from the spirit and scope of the invention. In the scale shown, a housing 21 is provided which consists of a base 22 and a cover 23. The base 22 supports a lever system 24 which, with the assistance of a coil spring 25, resiliently supports a load receiver 26. When loads are applied to the receiver 26, the latter will deflect various distances depending upon the weight of the load and the tension of the spring 25. The movement of the receiver and the lever system is transmitted by a link 27 to a rack supporting lever 28 which is journalled as at 30 for vertical swinging movement. At its free end, the lever 28 is forked and each branch is provided with a rack 31 the teeth of which mesh with those of pinions 32 fixed to a shaft 33 journalled for rotary movement in bearings 34 carried by the base 22.

Figure 3:
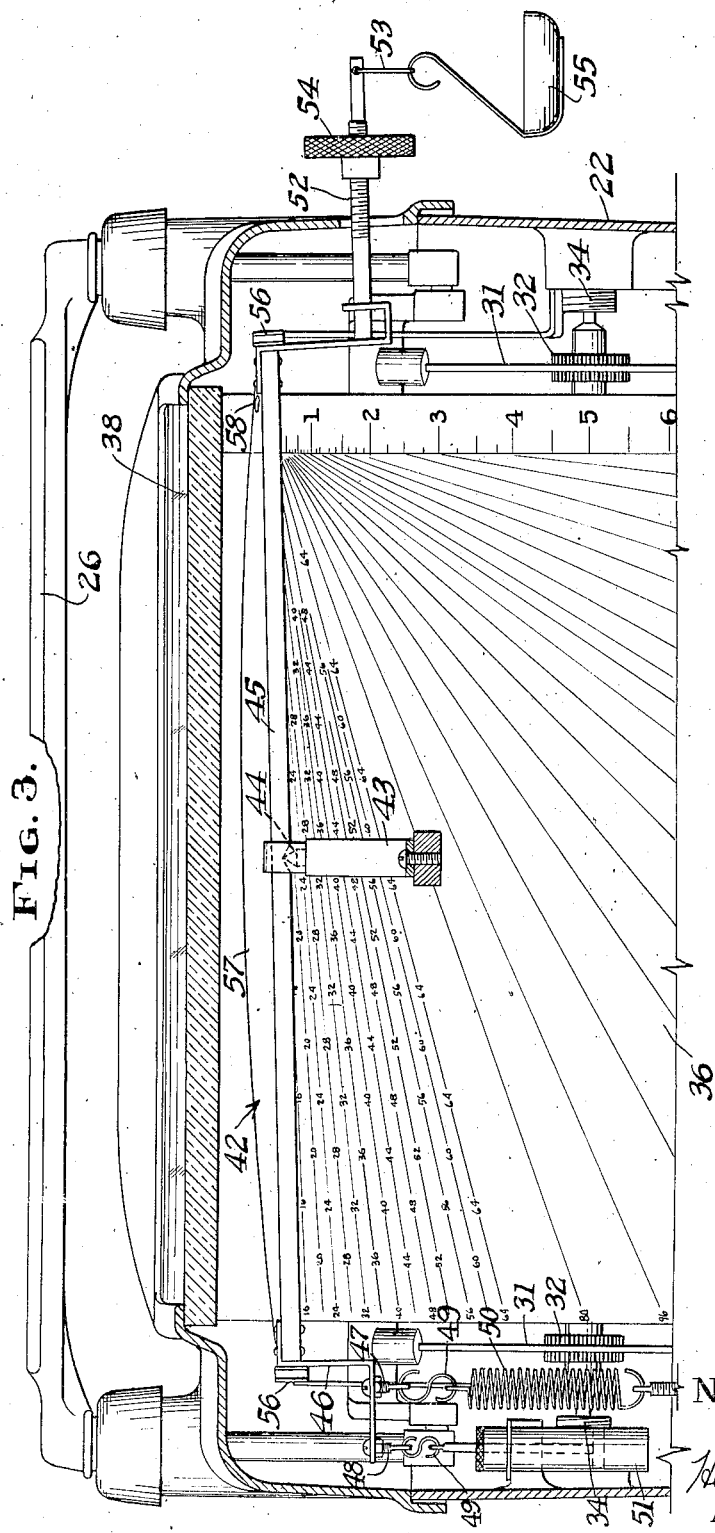
Fig. 3 is a vertical transverse sectional view taken through the scale on the plane shown by the line III—III of Fig. 1.

As illustrated in Figs. 1 and 3, the shaft 33 has drum spiders 35 fixed for rotation therewith, the spiders receiving a sheet-like chart 36. The chart 36 is coiled around and fixed to the spiders so that when the shaft revolves, due to the deflection of the receiver and levers, the chart will also rotate and pass a reading line 37 formed by a fine wire stretched lengthwise of the chart in slightly spaced relationship therefrom. The extent of rotation of the chart may be determined by comparing the position of graduations thereon relative to the reading line 37 through a glazed sight opening 38 formed in the cover 23.

The scale thus far described is conventional and a more detailed description thereof is believed to be unnecessary for a complete understanding of the present invention which in general consists of special graduations on the surface of the chart 36 and the particular construction and operation of an indicator used in conjunction with the chart.

Figures 5, 6:
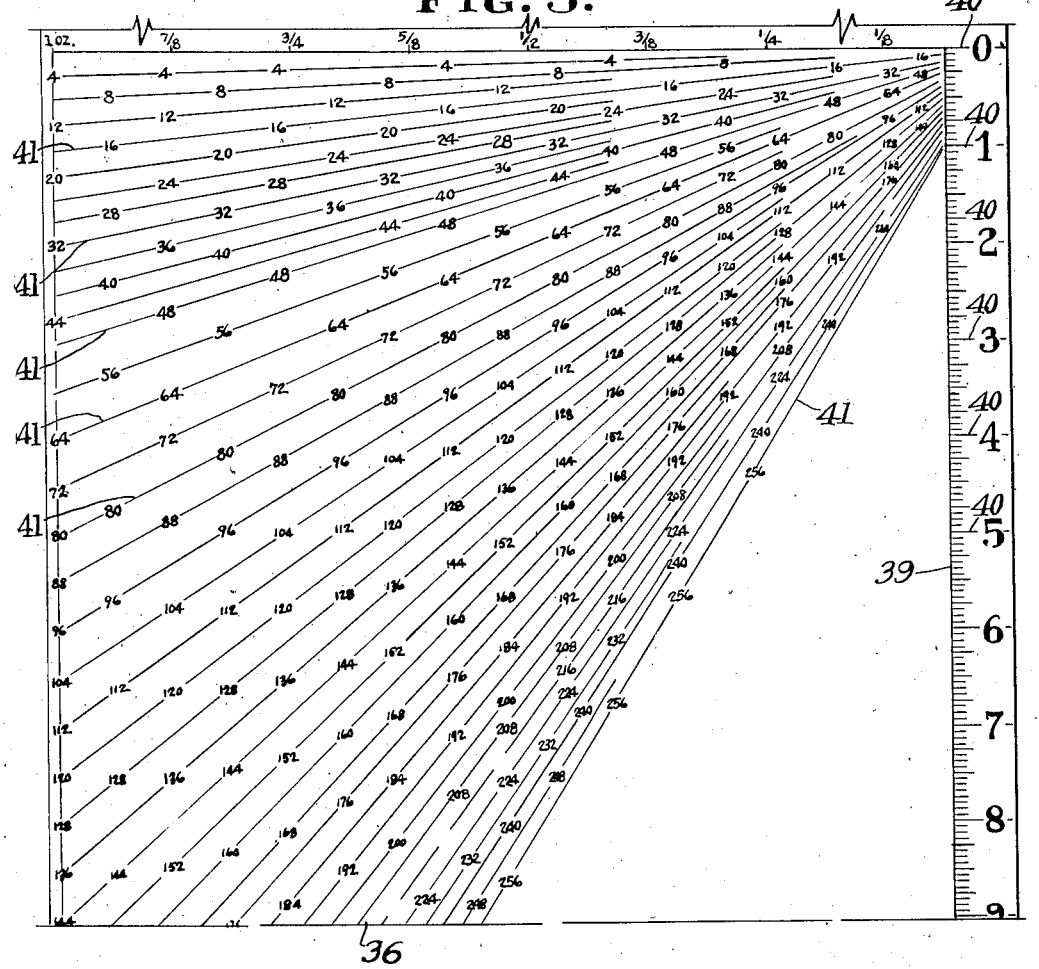
Fig. 5 is an elevational view of a portion of a chart used in the scale.
Fig. 6 is a vertical longitudinal sectional view taken through a transparent vial forming a part of the indicator shown in Fig. 4.

As shown more particularly in Fig. 5, the chart 36 comprises a strip of paper, parchment or the like, on which suitable graduations, reference lines and figures are printed, lithographed, stamped or otherwise applied. In the present invention, as illustrated, a row 39 of graduations is provided along the right hand edge of the chart 36. The row 39 includes graduations 40 which are numbered consecutively commencing with zero (0) and the spring and lever system are so selected that each graduation will represent one pound of weight. The spaces between adjacent pound graduations are equally divided into sixteen parts to represent ounces of weight. At the left hand edge, the chart is graduated into spaces equal to and horizontally registering with the pound spaces at the right hand edge of the chart. Reference lines 41 are extended across the chart from the ounce graduations in the row 39. These reference lines extend to the graduations at the left hand edge, the first line leading from the first ounce graduation at the right to the first pound graduation at the left, the second line leading from the second ounce graduation at the right to the second pound graduation at the left and so on.

These reference lines are numbered to indicate different quantities, for example, the line extending from the first ounce is numbered 16, the one extending from the second ounce is numbered 32, the lines from the following ounce graduations being numbered with numbers increasing at the rate of sixteen per line. As shown in Fig. 5, the spaces between the lines leading from the ounce graduations may be subdivided at the beginning of the chart, if desired, while one or more ounce reference lines may be omitted as the weights increase to prevent the chart from becoming too crowded.

Figure 4:
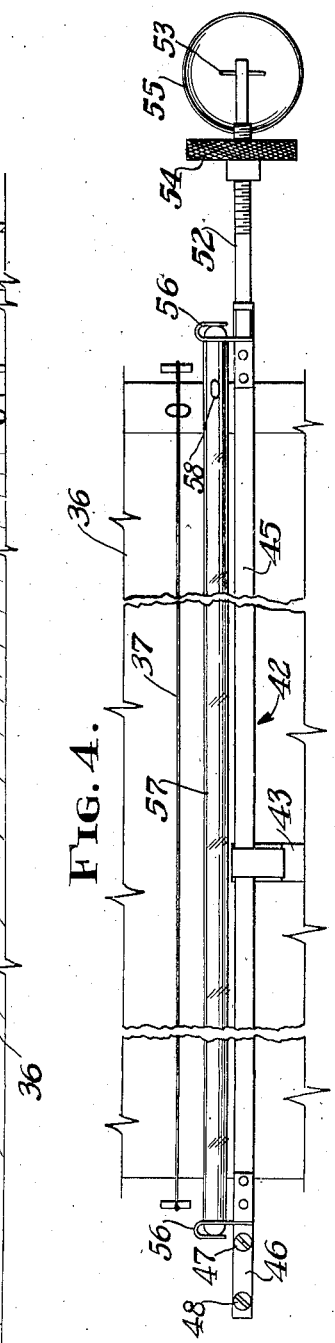
Fig. 4 is a plan view of an indicator forming a part of the scale shown in Fig. 1.

The indicating mechanism used with the chart is shown more particularly in Figs. 3 and 4. It includes an auxiliary scale 42 which is disposed in the front end of the scale casing 21 over the cylindrical chart and adjacent the sight opening 38. Scale 42 comprises a bracket 43 suitably carried by the scale casing and supporting a knife edge pivot 44 on which the scale beam 45 is mounted for rocking movement. One end of the beam 45 is equipped with an arm 46 having a pair of holes for the reception of connecting screws 47 and 48. These screws have holes through which one end of a pair of S-hooks 49 are inserted, the hook connected with the screw 47 serving to attach resistance spring 50 to the beam 45 while the other hook establishes a connection between the beam and a dashpot 51 of any suitable type. The other end of the spring 50 is attached to a stationary support so that the spring will resist movement of the lever or beam 45 in one direction.

The opposite end of the beam also carries an arm which serves to connect a screw 52 to the beam. This screw 52 projects through a slot in the side of the scale casing and adjustably receives a balance weight 54. At the outer end, the screw 52 has an opening for a hook 53 employed to support an auxiliary weight receiver 55 for free swinging movement. When a load is applied to the weight receiver 55, the beam 45 will be rocked about the pivot 44 through an angle the size of which depends upon the weight of the load.

Each end of the beam 45 is also provided with a bracket 56 to receive and support for rocking movement therewith, a transparent vial 57. This member is substantially filled with a suitable liquid until only a small bubble 58 of air remains and it is then sealed. As shown in Figs. 3 and 6, the vial is curved from end to end on a large radius and so supported in the brackets 56 that the intermediate portion of the vial will be higher than the ends when the beam is in a horizontal position. With the parts of the auxiliary scale so constructed, the bubble will move toward the right when the right hand end of the beam 45 is elevated and toward the left when a load is applied to the receiver 55. In the scale selected for illustration, the spring 50 is of such tension that a load of one ounce will cause the bubble 58 to move the full length of the vial which extends the full width of the chart.

The operation of the scale is as follows: One article of the group of duplicative articles to be counted is placed in the weight receiver 55. At this point it is important to note that if the articles are of such slight weight that one thereof when placed in the weight receiver 55, will not cause the bubble 58 to move over the weight indications to the part of the chart provided with the reference lines, then ten or one hundred of them should be used if necessary. The group of articles is then applied to the load receiver 26 to cause the chart to rotate a distance representing the weight of the group, which weight may be observed by inspecting the weight column of the chart. By sighting the chart at a point immediately at the rear of the point on the reading line nearest the bubble 58, the operator may instantly and directly read the number of articles in the group. If it was necessary to use ten articles in the weight receiver to move the bubble 58 beyond the weight column, a cipher should be added to the quantity shown on the chart. If one hundred articles were used, two ciphers should be added. It will thus be seen that the operator is not required to make any computations or calculations, either mentally or physically, in arriving at the quantity of articles in the group.

Further illustrating the operation of the scale, suppose the single article placed in the weight receiver caused the bubble 58 to move across the chart into registration with the row of graduations at the left edge of the chart, in other words, the article weighed one ounce. If the group of articles weighed one pound, it will be apparent that the chart would be revolved relative to the reading line until the point on the latter nearest the bubble crossed the reference line extending from the first ounce graduation in the weight column. The scale would thereby show that there were sixteen articles in the group which as may readily be seen, is exactly correct. If the tsingle article weighed only three quarters of an ounce, the bubble would move only three quarters of the distance across the chart and with one pound of articles on the load receiver 26, the point on the reading line nearest the bubble would lie just slightly beyond the reference line bearing the number 20 thus indicating that the group of articles contained slightly more than 20. In the event ten articles were required to move the bubble to such a point, a cipher would be added to the quantity making the same slightly in excess of 200.

Figure 7:
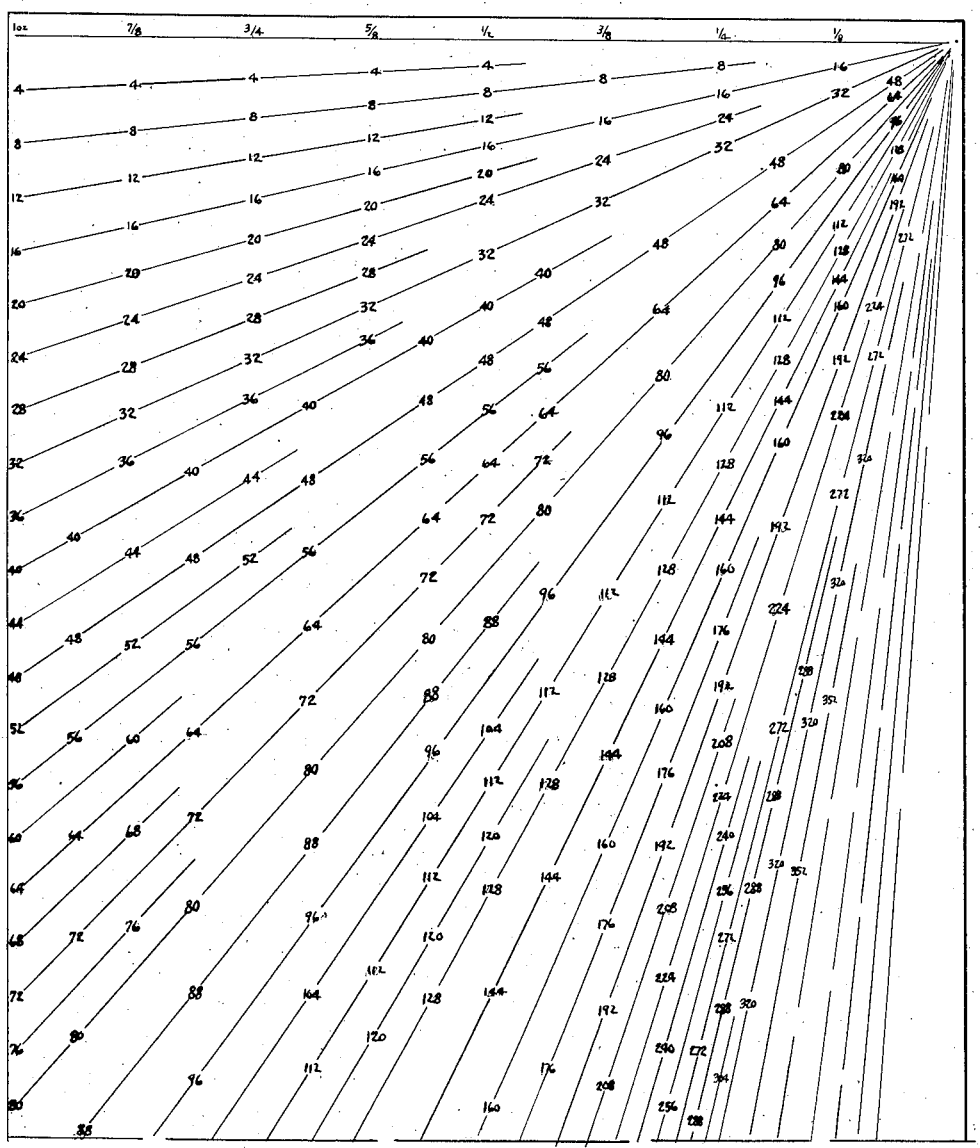
Fig. 7 is an elevational view of a slightly modified form of chart.

In the chart shown in Fig. 7, the column of pound and ounce graduations has been omitted and all the reference lines radiate from a single point at the upper right hand corner of the chart. The location of these reference lines is determined by extending a line parallel to the side edges of the chart at any place between these side edges and dividing such line into suitable equal parts then extending the reference lines from the upper right hand corner of the chart through the points of division. It is important to note that the spring 25 and lever system selected be such as to have the chart rotate through a certain number of the points of division mentioned above for each pound, or other unit of measurement, of weight applied to the receiver 26.

In the chart shown in Fig. 7, as in the chart 36, the lines which would have passed through some of the points of division in the higher weights have been omitted in the interests of clarity.

The quantity-indicating numerals applied to the reference lines will depend upon the weight necessary to move the bubble completely across the chart and the ratio of such weight to the unit of weight selected, for example, one pound, for the graduation of the chart. The weight required to cause the bubble to move the full width of the chart shown in Fig. 7 is one ounce, therefore, the reference line extending through the point of division representing one pound of weight would bear the number sixteen because one ounce is one sixteenth of a pound. The reference lines extending through each succeeding pound division would and do bear numbers increased at the rate of sixteen per pound. The reference lines passing through the lines of division between the pound reference lines will bear numbers depending upon the number of equal spaces they have been divided. In the charts shown, these pound spaces have been divided into four parts at the beginning of the chart thus making the reference lines bear numbers which increase at the rate of four units per line.

The pound and ounce units of measurement have been selected for convenience in fabricating and testing the scales and in graduating the charts. It should be understood that any other units of weight could be employed without departing from the concept of the invention. It should also be apparent that if sufficient numbers were arranged in rows radiating from the upper right hand edge of the chart, the reference lines could be omitted.

From the foregoing it will be obvious that a scale has been provided which will accurately indicate the number of duplicative articles in a mass thereof without requiring the operator to make any calculations. The chances of errors are thus minimized and less skill will be required by the operator. The scale will be dependable and accurate and may be used with safety to count minute, highly valuable articles.

It should be obvious to anyone skilled in the scale art that the scale shown herein could be modified in numerous ways without departing from the spirit and scope of the invention as set forth in the following claims.

I claim:

1. In a scale for counting duplicative articles, a cylindrical chart; spaced rows of graduations on said chart, the graduations in one row representing units of weight; the graduations in the other row being spaced in predetermined multiples of the graduations in the first row; reference lines extending across said chart between corresponding graduations in said rows means for revolving said chart relative to a stationary reference member in proportion to the weight of an unknown number of said articles; and a scale for selecting a point on said reference member spaced from one row of graduations a distance proportional to the weight of a known number of said articles, said scale having an indicator element movable between said rows in response to the application of a weight equal to that represented by a graduation in said first row.

2. In a scale for counting duplicative articles, a chart having numbered reference lines radiating from a single point through other points spaced equally in a row disposed at right angles to a line passing through said first point; weight-operated means for moving said chart in a direction parallel to said row of points, said chart being moved a predetermined distance by a selected unit of weight; and weight-operated means for moving an index transversely of said chart at an angle to the direction of movement of said chart, said index being moved completely across said chart by a predetermined fractional part of said selected unit of weight.

3. In a scale for counting duplicative articles, a chart having numbered reference lines radiating from a single point through other points spaced equally in a row disposed at right angles to a line passing through said first point; weight-operated means for moving said chart in a direction parallel to said row of points, said chart being moved a predetermined distance by a selected unit of weight; and weight-operated means for moving an index over said chart at right angles to the direction of movement of said chart, said index being moved completely across said chart by a predetermined fractional part of said selected unit of weight.

4. In a mechanism for counting duplicative articles, a chart having reference lines radiating from a single point through other points disposed in a row extending at right angles to a line passing through said first point, said lines being progressively numbered; weight-operated means for moving said chart in a direction parallel to said row, said chart being moved a predetermined distance by a selected unit of weight; and weight-operated means for moving an index over said chart at right angles to the direction of movement thereof.

5. A machine for determining the number of duplicative articles in a group thereof comprising a chart having numbered reference indications radiating from a single point through other points spaced equally in a row disposed at right angles to a line passing through said first point; means responsive to the weight of said group of articles for moving said chart in a direction parallel to said row of points, said chart being moved equal distances by equal units of weight; an index movable relative to said chart in a direction substantially at right angles to the direction of movement thereof; and means responsive to the weight of a known number of the articles of said group for moving said index.

6. A mechanism for determining the number of duplicative articles in a group thereof comprising a chart having progressively numbered reference indications radiating from the same point adjacent one edge of said chart through other points spaced in a row disposed at right angles to a line passing through said first point; means responsive to the weight of said group of articles for moving said chart in a direction parallel to said row of points; said chart being moved equal distances by equal units of weight; an index normally disposed adjacent the edge of said chart nearest said single point, said index being movable relative to said chart in a direction substantially at right angles to the direction of movement of the chart; and means responsive to the weight of a known number of the articles in said group for moving said index from its normal position.

7. In a device for determining the number of duplicative articles in a group thereof, a scale mechanism having a chart provided with progressively increasing number groups arranged in rows radiating from a single point and passing through other spaced points disposed in a row extending at right angles to a line passing through said first point, said scale mechanism moving said chart in a direction parallel to said row of points in response to the application of said group of articles to the weight receiver of said scale; and means for moving an index across said chart substantially at right angles to the direction of movement thereof, said index-moving means comprising a second scale having an index; a weight receiver for a known number of articles from said group; and means for resisting the movement of said index, said resisting means permitting said index to move distances proportional to the weight of the articles on the weight receiver of the second scale.

8. In a mechanism for counting duplicative articles, a movable chart having reference lines radiating from a single point through other points disposed in a row parallel to the direction of movement of said chart; weight-operated means for moving said chart; and weight-operated means for selecting a point along a line extending over said chart at right angles to the direction of movement of said chart.

9. In a mechanism for counting duplicative articles, a chart having reference lines radiating from a single point through other points disposed in a row extending at right angles to a line passing through said first point; weight-operated means for moving said chart in a direction parallel to said row; and weight-operated means for selecting a point along a substantially stationary line extending over said chart at right angles to the direction of movement of said chart.

10. In a mechanism for counting duplicative articles, a chart having a plurality of reference lines radiating from a single point through other points disposed in a row extending at right angles to a line passing through said first point; weight-operated means for moving said chart in a direction parallel to said row, said chart being moved a predetermined distance by a selected unit of weight; and weight-operated means for selecting a point along a line extending over said chart at an angle to the direction of movement of said chart.

11. A scale for determining the number of duplicative articles in a group thereof comprising a two-dimensional graduated chart; a reference member extending across said chart; weight-operated means for moving said chart in a direction extending at an angle to said reference member; and weight-operated means for selecting a point along said reference member; one of said weight-operated means being responsive to the weight of said group of articles and the other weight-operated means being responsive to the weight of a known number of said articles.

12. A scale for determining the number of duplicative articles in a group thereof comprising a rotatable cylindrical graduated chart; a substantially stationary reference member extending across said chart; weight-operated means for rotating said chart so that it moves in a direction extending substantially at right angles to said reference member; and weight-operated means for selecting a point along said reference member; one of said weight-operated means being responsive to the weight of said group of articles and the other weight-operated means being responsive to the weight of a known number of said articles.

13. A scale for determining the number of duplicative articles in a group thereof comprising a rotatable cylindrical graduated chart member; a reference member having a point selecting index; weight-operated means for rotating said chart member; and weight-operated means for moving said point selecting index relative to said chart member at an angle to the direction of movement thereof; one of said weight-operated means effecting movement a distance corresponding to the weight of said group of articles and the other weight-operated means effecting movement a distance representing the weight of a known number of said articles.

14. A scale for determining the number of duplicative articles in a group thereof comprising a two-dimensional graduated chart member; a reference member having a point selecting index; weight-operated means for moving said chart member; and weight-operated means for moving said point selecting index relative to said chart member substantially at right angles to the direction of movement thereof; one of said weight-operated means effecting movement a distance corresponding to the weight of said group of articles and the other weight-operated means effecting movement a distance representing the weight of a known number of said articles.

15. A scale for determining the number of duplicative articles in a group thereof comprising a two-dimensional chart; a reference member providing an indicating line extending substantially parallel to one of the dimensions of said chart; weight-operated means for moving said chart at substantially right angles to said indicating line; and weight-operated means for selecting a point along said indicating line at which a reading from said chart may be taken; one of said weight-operated means being responsive to the weight of said group of articles and the other weight-operated means being responsive to the weight of a known number of said articles.

16. In a mechanism for counting duplicative articles, a movable chart having reference lines radiating from a single point through other points disposed in a row extending parallel to the direction of movement of said chart; weight-operated means for moving said chart; and means for selecting a point along a line extending over said chart at right angles to the direction of movement of said chart, the point selected being determined by the weight of a predetermined number of said articles being counted.

17. In a mechanism for counting duplicative articles, a movable chart having reference lines radiating from a single point through other points disposed in a row parallel to the direction of movement of said chart; weight-operated means for moving said chart; means for selecting a point along a line extending over said chart at right angles to the direction of movement of said chart; and means for moving said point selecting means from the side of said chart from which said reference lines radiate toward said row of points, said point selecting means being moved distances proportionate to the weight of a known number of the duplicative articles being counted.

NATHAN A. HALLWOOD.

REFERENCES CITED

The following references are of record in the file of this patent:

UNITED STATES PATENTS

| Number | Name | Date |
|---|---|---|
| 1,459,886 | Hammond | June 26, 1923 |
| 1,729,788 | Mittendorf | Oct. 1, 1929 |
| 1,861,087 | Hallwood | May 31, 1932 |
| 1,918,877 | Templeton | July 18, 1933 |
| 2,071,416 | Marshall | Feb. 23, 1937 |
| 2,097,025 | Flanagan | Oct. 26, 1937 |
| 2,316,627 | Sang | Apr. 13, 1943 |

FOREIGN PATENTS

| Number | Country | Date |
|---|---|---|
| 406,309 | Great Britain | 1933 |